US010019849B2

(12) United States Patent
Berman et al.

(10) Patent No.: US 10,019,849 B2
(45) Date of Patent: Jul. 10, 2018

(54) PERSONAL ELECTRONIC DEVICE WITH A DISPLAY SYSTEM

(71) Applicant: zSpace, Inc., Sunnyvale, CA (US)

(72) Inventors: Arthur L. Berman, San Jose, CA (US); Clifford S. Champion, San Jose, CA (US); David A. Chavez, San Jose, CA (US); Francisco Lopez-Fresquet, Boulder Creek, CA (US); Jonathan J. Hosenpud, San Francisco, CA (US); Robert D. Kalnins, San Jose, CA (US); Alexandre R. Lelievre, Hollywood, CA (US); Christopher W. Sherman, Leesburg, VA (US); Jerome C. Tu, Saratoga, CA (US); Kevin S. Yamada, Sunnyvale, CA (US); Chun Wun Yeung, Cupertino, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 15/223,952

(22) Filed: Jul. 29, 2016

(65) Prior Publication Data
US 2018/0033211 A1 Feb. 1, 2018

(51) Int. Cl.
G06T 19/00 (2011.01)
G06T 19/20 (2011.01)
H04N 13/04 (2006.01)
G06F 3/0488 (2013.01)
G06F 3/0481 (2013.01)
G06F 3/0484 (2013.01)
G06F 3/16 (2006.01)
G06F 3/0354 (2013.01)

(52) U.S. Cl.
CPC .......... G06T 19/20 (2013.01); G06F 3/03545 (2013.01); G06F 3/04815 (2013.01); G06F 3/04842 (2013.01); G06F 3/04845 (2013.01); G06F 3/04883 (2013.01); G06F 3/04886 (2013.01); G06F 3/16 (2013.01); G06T 19/00 (2013.01); G06T 19/003 (2013.01); G06T 19/006 (2013.01); H04N 13/04 (2013.01)

(58) Field of Classification Search
None
See application file for complete search history.

(56) References Cited

U.S. PATENT DOCUMENTS

| 8,643,569 B2* | 2/2014 | Vesely | G06F 3/011 345/156 |
| 2010/0208033 A1 | 8/2010 | Edge | |
| 2011/0122130 A1* | 5/2011 | Vesely | G06T 15/20 345/419 |
| 2011/0138317 A1* | 6/2011 | Kang | G06F 3/011 715/780 |
| 2012/0162214 A1* | 6/2012 | Chavez | G06F 3/012 345/419 |
| 2012/0249443 A1* | 10/2012 | Anderson | A63F 13/06 345/173 |

(Continued)

Primary Examiner — Ryan D McCulley
(74) Attorney, Agent, or Firm — Meyertons Hood Kivlin Kowert & Goetzel, P.C.; Jeffrey C. Hood; Brian E. Moore

(57) ABSTRACT

Systems and methods for interacting with a display system using a personal electronic device (PED). The display system may establish communication with and receive user input from the PED. The display system may use the received user input to generate and/or update content displayed on a display of the display system.

30 Claims, 11 Drawing Sheets

(56) References Cited

U.S. PATENT DOCUMENTS

| | | | |
|---|---|---|---|
| 2012/0249531 A1* | 10/2012 | Jonsson | G06F 3/0346 345/419 |
| 2013/0083025 A1* | 4/2013 | Gibson | G06F 3/1438 345/428 |
| 2013/0109477 A1* | 5/2013 | Ito | A63F 13/42 463/37 |
| 2013/0141434 A1* | 6/2013 | Sugden | G02B 27/017 345/426 |
| 2013/0249947 A1 | 9/2013 | Reitan | |
| 2013/0249948 A1 | 9/2013 | Reitan | |
| 2014/0063061 A1* | 3/2014 | Reitan | G09G 3/003 345/633 |
| 2014/0184589 A1* | 7/2014 | Vesely | G06F 3/012 345/419 |
| 2014/0240312 A1* | 8/2014 | Vesely | G06T 15/00 345/419 |
| 2014/0267637 A1* | 9/2014 | Hoberman | H04N 13/0429 348/53 |
| 2014/0317575 A1* | 10/2014 | Ullmann | G06T 19/20 715/852 |
| 2015/0061969 A1* | 3/2015 | Chi | G06F 3/013 345/2.3 |
| 2015/0123891 A1* | 5/2015 | Tu | G06F 3/017 345/156 |
| 2016/0154457 A1* | 6/2016 | Osaragi | G06F 3/011 345/179 |
| 2017/0061700 A1* | 3/2017 | Urbach | G06F 3/011 |

\* cited by examiner

PERSONAL ELECTRONIC DEVICE WITH A DISPLAY SYSTEM

TECHNICAL FIELD

This disclosure relates to the field of digital display and more particularly to methods and systems for using a personal electronic device (PED) with a display system.

DESCRIPTION OF THE RELATED ART

Three dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel). That is, the video scalar may be optional in some embodiments.

Time Sequential Stereo Displays

Unlike a normal (i.e., monoscopic) display, in a stereo display, there are two images for each video frame: right and left. The right image is delivered to only an observer's right eye, and the left image is delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system may include stereoscopic eyewear that is designed such that the left lens will only pass the left state polarization and the right lens will only pass the right state polarization. In this way, separation of the right and left images is achieved.

The second conventional architecture may use stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth. Virtual objects may be displayed in this created 3D space, which exists both above the 3D stereoscopic display panel (i.e., negative space) and below the stereoscopic display panel (i.e., positive space).

SUMMARY

Various embodiments are presented of systems/methods for interacting with a display system (e.g., a two dimensional (2D) display system or a three dimensional (3D) display system) using a personal electronic device (PED). The system may include one or more displays and at least one processor coupled to the one or more displays. In some embodiments, the one or more displays and at least one processor may be comprised in a head mounted display system. In some embodiments, the system may further include a stylus communicatively coupled to the at least one processor and a memory coupled to the at least one processor. The processor may be configured to perform or implement embodiments of the techniques disclosed herein. Additionally, a method implementing embodiments of the techniques may be implemented on a computer or stored as program instructions on a computer readable memory medium.

In some embodiments, a display system may establish communications with a PED. The PED may communicate with the display system via a local area network such as a WiFi, Bluetooth, Bluetooth low energy connection, near field communication (NFC), and/or radio frequency identification (RFID)) or via a wired interface. During an initial set-up of a PED with the display system, a user may interact with the PED to send information to the display system. For example, a user may sign in to a profile associated with that user. The display system may use information in a user's profile to customize interaction with the display system.

In some embodiments, the display system may display one or more virtual objects on a display of the display system. The display system may be configured to display a 3D scene (e.g., via stereoscopic images), or 3D content using one or more displays (e.g., displays 150A and/or display 150B of FIG. 3). The displayed content may include objects (e.g., 3D virtual objects) and/or user interface (UI) elements (e.g., selectable elements that allow a user to interact with the content and/or with the display system).

In some embodiments, the display system may receive user input from the PED, wherein the user input includes one or more control inputs. The PED may be configured as an input device to the display system and/or as a device to receive, store, transmit, process, and/or otherwise use data associated with the display system (e.g., data associated with the content displayed by the display system). The PED may provide user input to the display system that includes one or more control inputs that allow the user to update the displayed content (e.g., by manipulating one or more virtual objects according to the control inputs). The PED may provide user input to the display system that includes input data (e.g., video data, image data, and/or audio data) corresponding to information received, stored, transmitted, processed, and/or otherwise used by the PED.

In some embodiments, responsive to receiving the user input, the display system may update the virtual objects on the display of the display system. If the display system receives a control input from the PED, the display system may update the displayed content by manipulating the content according to the received control input. If the display system receives user input data, the display system may update the displayed content by presenting the user input data on the display of the display system (e.g., incorporating the user input data into the displayed content).

BRIEF DESCRIPTION OF THE DRAWINGS

A better understanding of the present disclosure can be obtained when the following detailed description of the preferred embodiment is considered in conjunction with the following drawings, in which.

Figure 1:
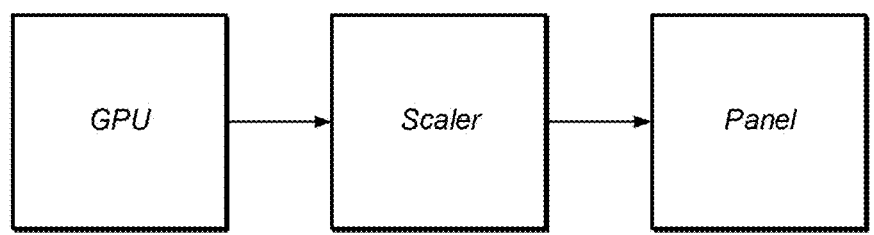
FIG. 1 illustrates a modern display chain, according to the prior art.
Figure 2A:
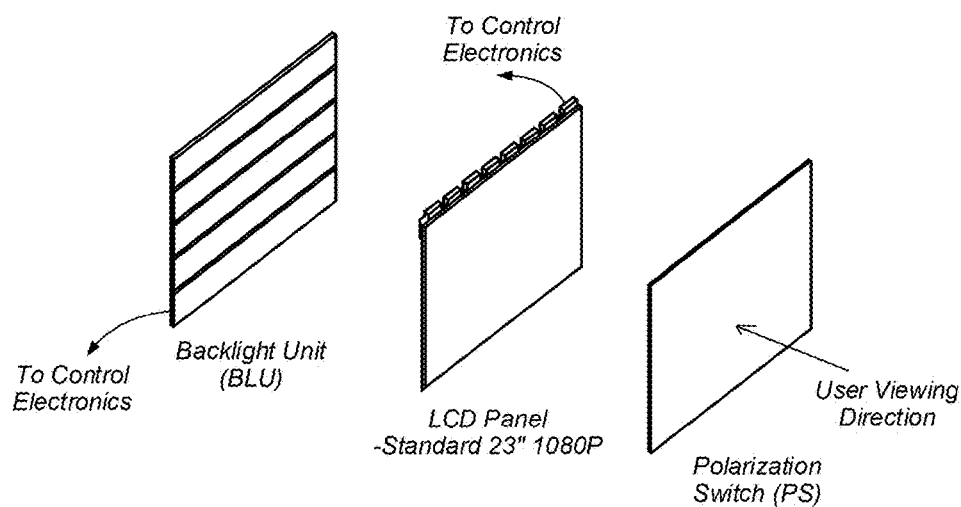
FIG. 2A illustrates an example of an architecture that utilizes a polarization switch, according to the prior art.
Figure 2B:
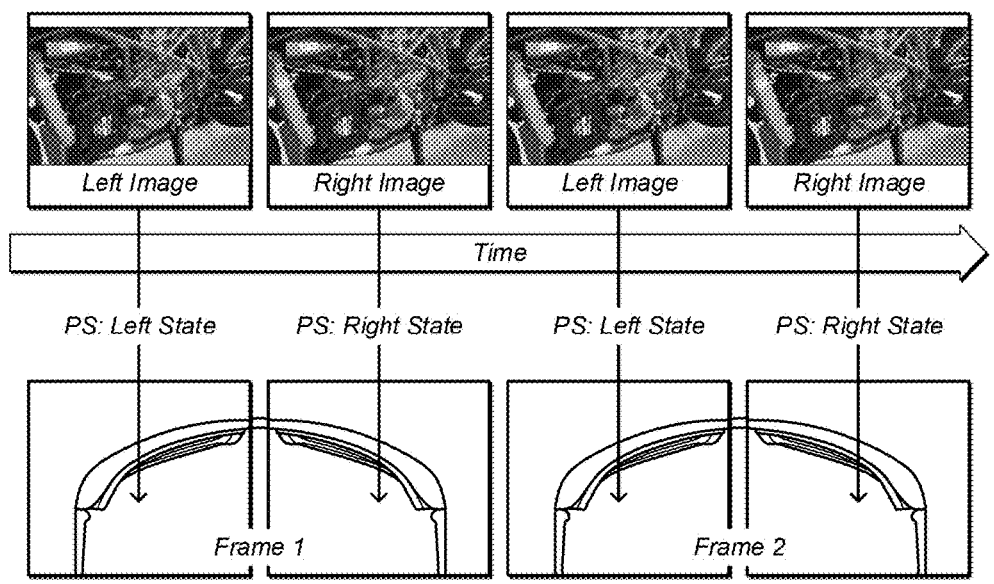
FIG. 2B illustrates an example of a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a computer system as defined above (e.g., a personal computer, workstation, server, graphics server, or equivalent), and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Mobile Device (or Mobile Station or Personal Electronic Device)—any of various types of computer systems or devices that are mobile or portable and that performs wireless communications using WLAN and/or cellular communication. A mobile device or a personal electronic device (PED) may include a standard or general purpose electronic device that is configurable to perform one or more application-specific functions (e.g., interacting with a display system). Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" or "Wireless Local Area Network" has the full breadth of its ordinary meaning, and at least includes a wireless communication network or Radio Access Technology (RAT) that is serviced by WLAN access points and which provides connectivity through these access points to the Internet. Most modern WLANs are based on IEEE 802.11 standards and are marketed under the name "Wi-Fi." A WLAN network is different from a cellular network.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Coupled Zone—refers to a physical volume in which the user of a 3D stereoscopic display can view 3D content within the human eye's natural depth of field. When a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers to the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as between 89 to 91 degrees, 85 to 95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45 degree angle render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as between 44 to 46 degrees, 40 to 50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including." As used in the appended claims, this term does not foreclose additional elements, structure, or steps. Consider a claim that recites: "A system comprising a display . . . ." Such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3:
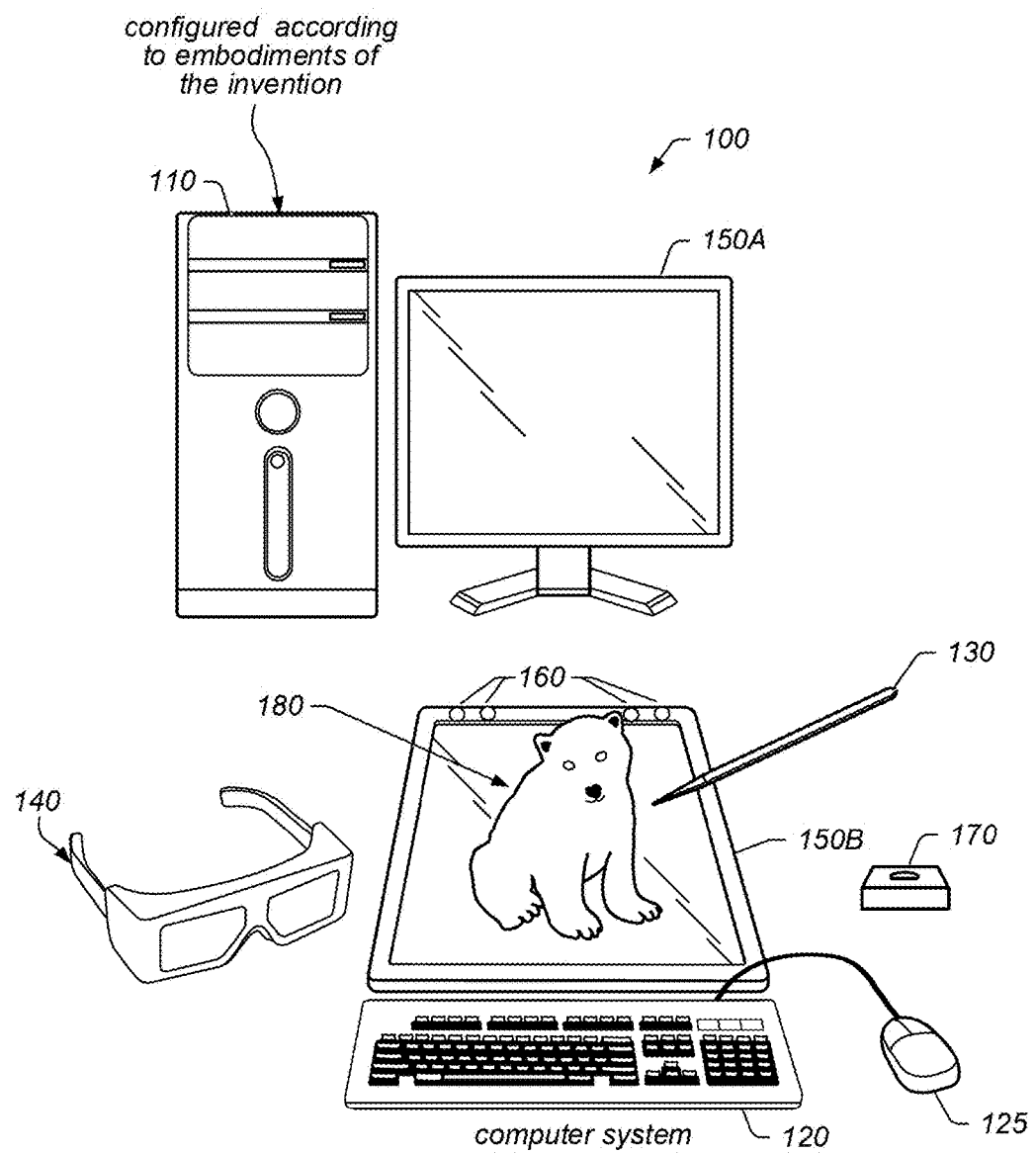
FIG. 3 illustrates an example 3D stereoscopic display system configured according to some embodiments.

FIG. 3 illustrates an exemplary system configured to implement various embodiments of the techniques described below.

In the exemplary embodiment of FIG. 3, system 100 may include chassis 110, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the system 100 may be configured to display a three dimensional (3D) scene (e.g., via stereoscopic images), or 3D content, such as scene 180, using the display 150A and/or the display 150B. The system 100 may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of Figure is exemplary only, and other numbers of displays are also envisioned. For example, the system 100 may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images and/or auto-stereoscopic images for viewing by the user. By presenting such images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, personal electronic device, etc.) may be used to interact with the presented 3D scene. As further described herein, a personal electronic device may serve as at least one of the one or more user input devices. In other words, a personal electronic device may supplement and/or replace other potential user input devices (e.g., a stylus). The user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, all four cameras 160 may be used to sense all tracked targets (e.g., a user point of view and a user input device). In other words, all four cameras 160 may work in conjunction rather than two cameras tracking one target and the remaining two cameras tracking the other target. Alternatively, fewer than four sensors may be used (e.g., two sensors), wherein each sensor may track both the user (e.g., the user's head and/or the user's point of view) and the user input device. Sensors 160 may be used to image a user of system 100, track a user's movement, or track a user's head or eyes, among other contemplated functions. In one embodiment, cameras 160 may track a position and/or an orientation of user input device 130 and/or a user's hands. The information regarding the position (including the orientation) of the user input device 130 and/or the user's hands provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. According to some embodiments, system 100 may optionally include a caddy 170 to store user input device 130. Caddy 170 may be used to hold, store, and/or calibrate the stylus (e.g., calibrate the orientation of the stylus to a known roll, pitch, and yaw, and so may be in a fixed position relative to cameras 160). Note that caddy 170 may not be required to calibrate the orientation of the stylus.

In one embodiment, the system 100 may be configured to couple to a network, such as a wide area network, via an input. The input may be configured to receive data (e.g., image data, video data, audio data, etc.) over the network from a system similar to system 100. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110 to determine a position or a POV, e.g., via execution of one more programs by or on a processor or functional unit of chassis 110, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110.

Thus, the system 100 may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100 may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

Figure 4:
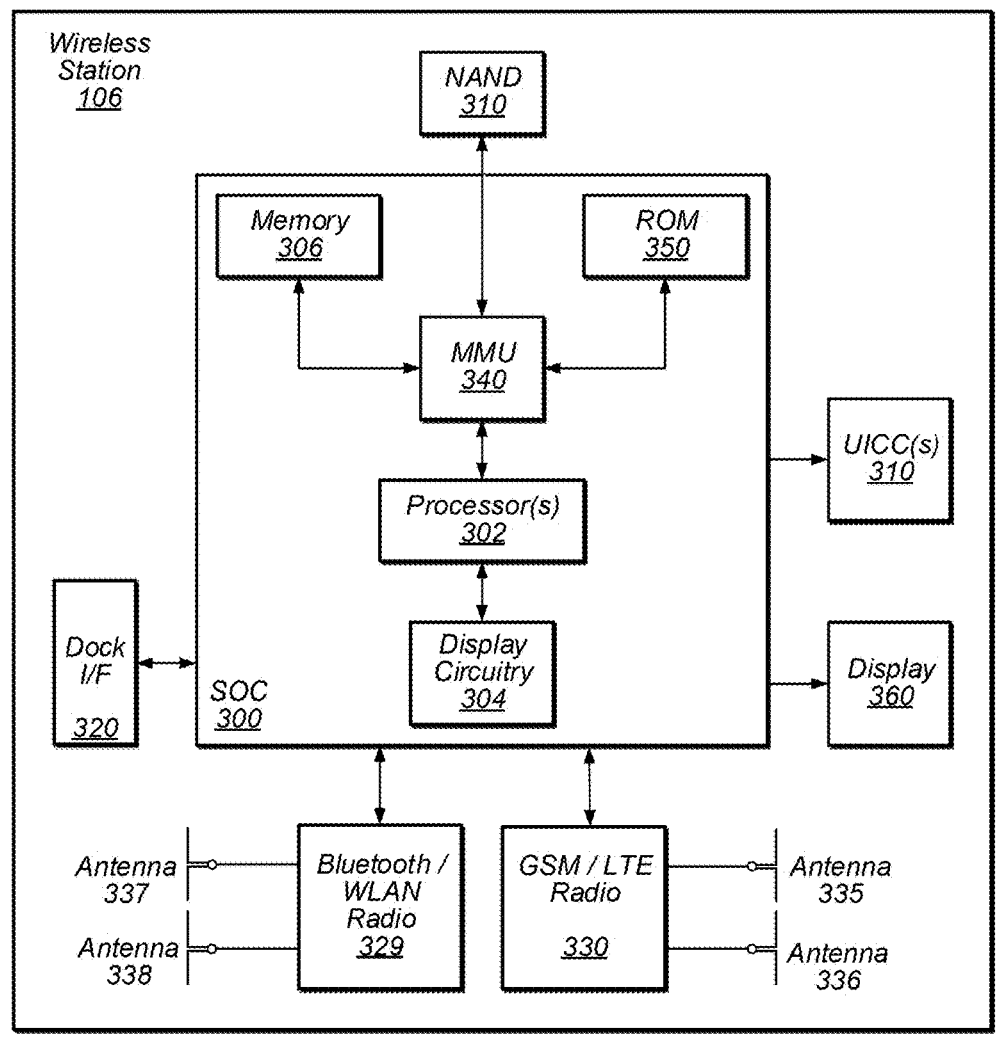
FIG. 4 illustrates an example block diagram of a user equipment device configured according to some embodiments.

FIG. 4 illustrates an example simplified block diagram of a wireless station 106. According to embodiments, wireless station 106 may be a user equipment (UE) device, a mobile device, and/or mobile station. Wireless station 106 may be used in conjunction with the system described above in reference to FIG. 3 and the systems described below in reference to FIG. 7. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a WiFi, Bluetooth, or Bluetooth low energy connection) or via a wired interface such as a universal serial bus interface, among other wired interfaces.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
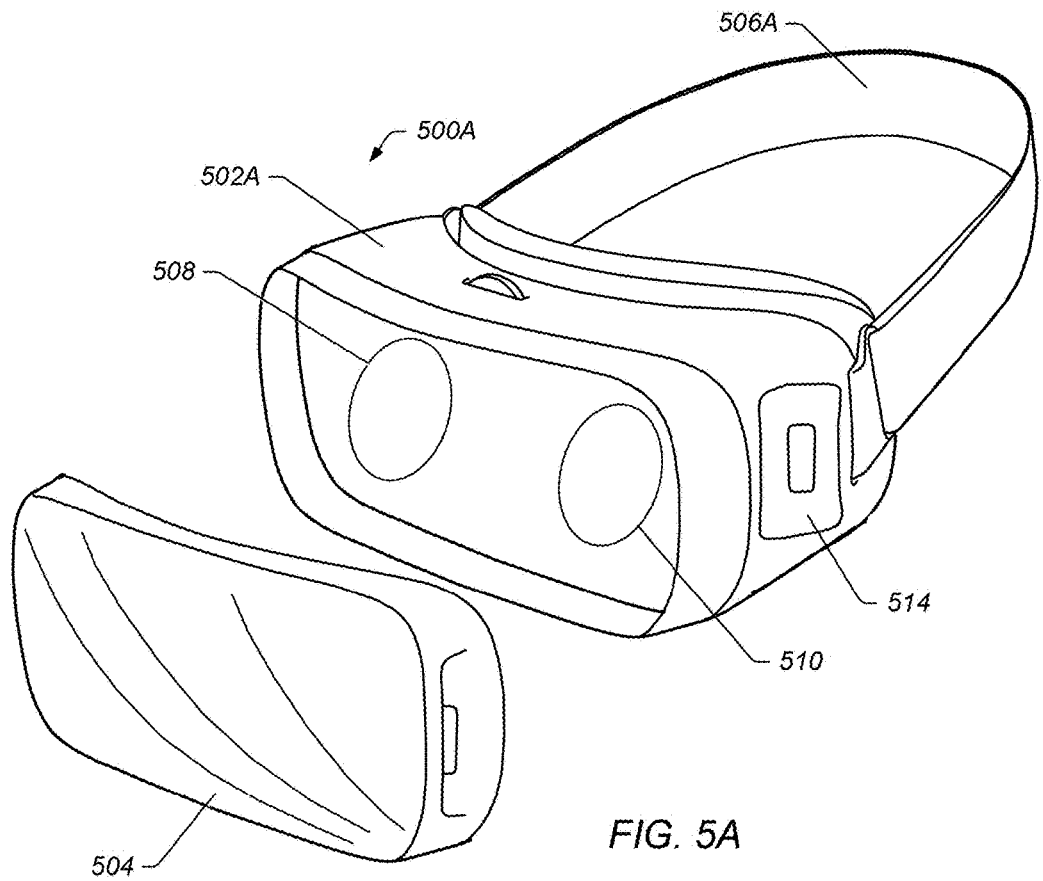
FIGS. 5A and 5B illustrates examples of a 3D head-mounted stereoscopic display system configured according to embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
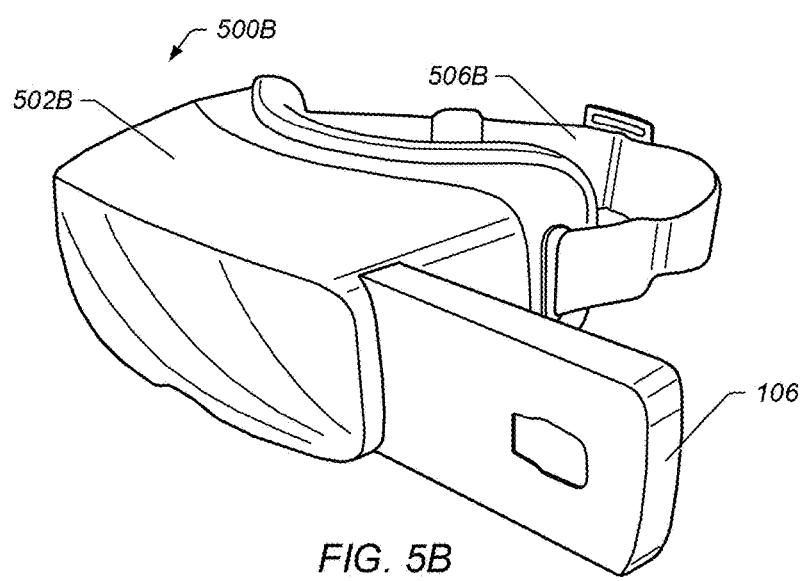

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
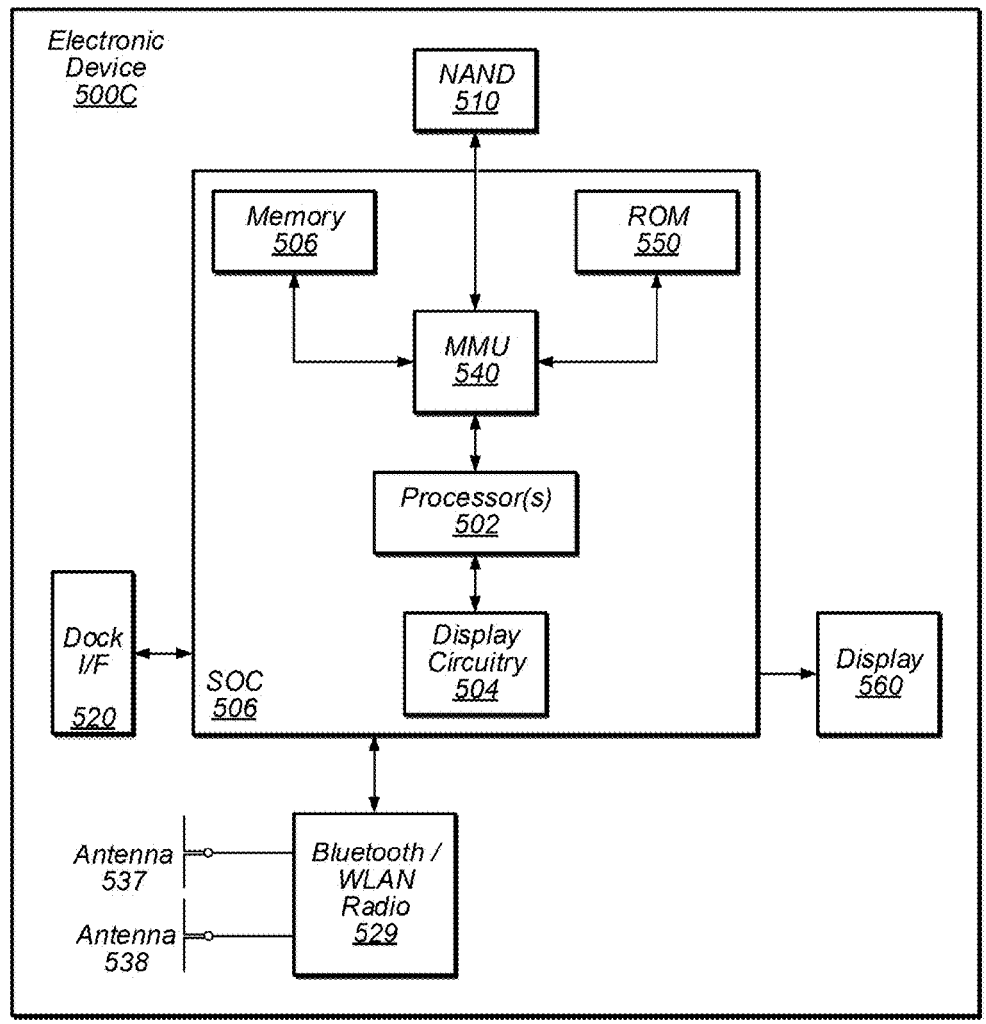
FIG. 5C illustrates an example block diagram of a head-mounted stereoscopic display system configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a display system (e.g., a 3D display system) such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
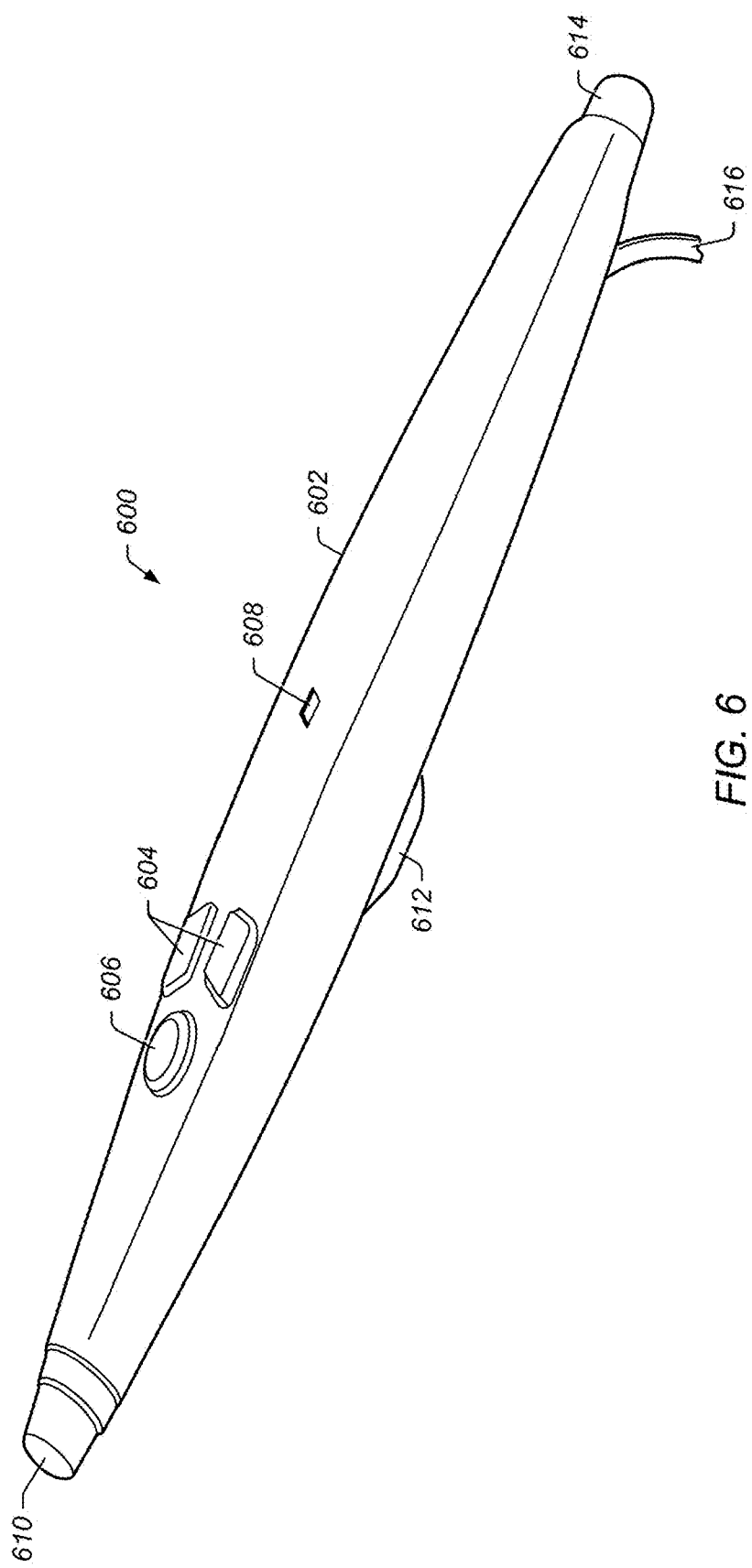
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, system 100 or systems 500 and 550. As described above, systems 100, 500, and 550 may have the capability to determine the six axis position and orientation of user input device 600. Note that this includes the X, Y, Z location of tip 610 of user input device 600 and the α, β, γ angular orientation of body 602 of user input device 600. However, it should be further noted that user input device 600 is exemplary, and that other user input devices, suitably configured, may be used as desired.

As shown, user input device 600 may include buttons 604, 606, and 612. One of the buttons, such as button 606, may be depressed and held down to trigger the selection of an object within a 3D scene presented by any of systems 100, 500, and 550. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Use of Personal Electronic Device

FIGS. 7-10, described below in detail, illustrate various embodiments of use of a personal electronic device (PED) with a display system. According to some embodiments, the above described systems (e.g., a 3D display system, a two dimensional (2D) display station, and the like) may be configured to communicate with a PED. For example, embodiments may enable a PED to be used as an input device and/or as a device to receive, store, transmit, process, and/or otherwise use data associated with the display system.

Figure 7:
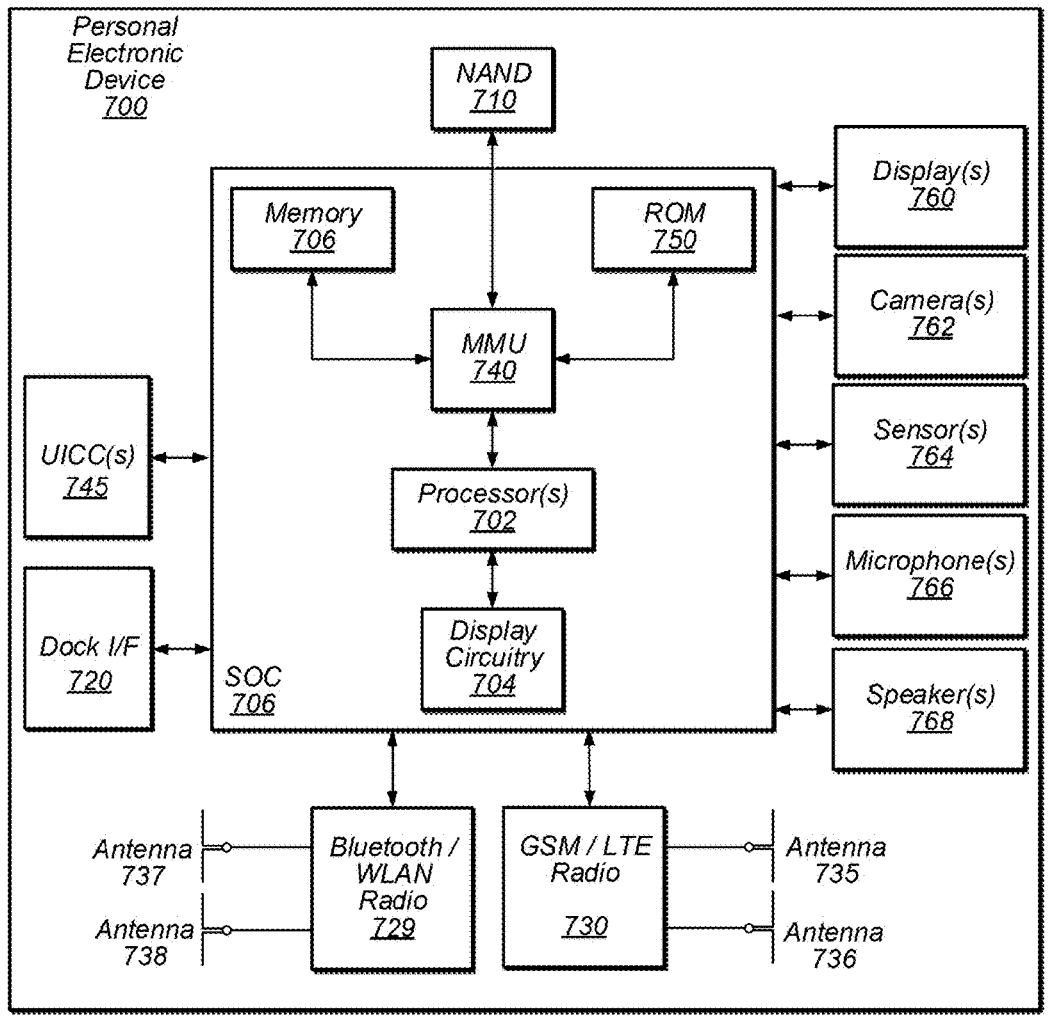
FIG. 7 illustrates an example simplified block diagram of a personal electronic device (PED), according to some embodiments.

Turning to FIG. 7, FIG. 7 illustrates an example simplified block diagram of a personal electronic device (PED), according to some embodiments. PED 700 may be a a mobile device and/or a wireless station, as defined above. PED 700 may be used in conjunction with the systems described above (e.g., the system described in reference to FIG. 3). For example, PED 700 may be configured as an input device to any of the described systems (e.g., PED 700 may be configured as a user input device) and/or as a device to receive, store, transmit, process, and/or otherwise use data associated with any of the described systems (e.g., system 100, which may be a 3D display system). As another example, according to some embodiments, PED 700 may be configured as a display of any of the described systems. Thus, PED 700 may be configured to display an image (e.g., a stereoscopic image). In some embodiments, PED 700 may be configured to communicate with a display system (e.g., a 3D display system) either wirelessly (e.g., via a local area network such as a WiFi, Bluetooth, Bluetooth low energy connection, near field communication (NFC), and/or radio frequency identification (RFID)) or via a wired interface, such as a universal serial bus interface, among other wired interfaces.

As shown, the PED 700 may include a system on chip (SOC) 706, which may include portions for various purposes. The SOC 706 may be coupled to various other circuits of the PED 700. For example, PED 700 may include various types of memory (e.g., including NAND flash 710), a connector interface (I/F) (or dock) 720 (e.g., for coupling to a computer system, dock, charging station, external display, etc.), one or more displays 760 (e.g., including a touch screen display), cellular communication circuitry 730, such as for LTE, GSM, and the like, and/or short to medium range wireless communication circuitry 729 (e.g., Bluetooth™ and/or WLAN circuitry). PED 700 may further include one or more smart cards 710 that incorporate SIM (Subscriber Identity Module) functionality, such as one or more UICC(s) (Universal Integrated Circuit Card(s)) cards. The cellular communication circuitry 730 may couple to one or more antennas, such as antennas 735 and 736 as shown. The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 706 may include processor(s) 702, which may execute program instructions for PED 700 and display circuitry 704, which may perform graphics processing, provide display signals to the display 760 (and/or to dock 720), provide audio signals to the speaker(s) 768 (and/or to dock 720), provide vibration/haptic output to a vibration generator/haptic engine, and/or receive user input via any of the components of PED 700 (e.g., via display 760, which may be a touch screen display, camera(s) 762, sensors(s) 764, and/or microphone(s) 766). The processor(s) 702 may also be coupled to memory management unit (MMU) 740, which may be configured to receive addresses from the processor(s) 702 and translate those addresses to locations in memory (e.g., memory 706, NAND flash memory 710, and/or read only memory (ROM) 750) and/or to other circuits or devices, such as the display circuitry 704, short range wireless communication circuitry 729, cellular communication circuitry 730, connector interface (I/F) 720, and/or display 760. The MMU 740 may be configured to perform memory protection and page table translation or set up. In some embodiments, the MMU 740 may be included as a portion of the processor(s) 702.

In some embodiments, PED 700 may be in communication with a user input device, such as user input device 130 described above. In some embodiments, PED 700 may receive user input via user input device 130 as described above.

In addition, PED 700 may include hardware and software components for receiving user input. For example, display 760 of PED 700 may include a touch screen display for receiving user input. The display 760 may be coupled to processor(s) 702, which may execute program instruction for receiving and processing user input received via display 760. In addition, PED 700 may include one or more cameras 762. For example, PED 760 may include a front camera and/or a rear camera. Data received via the one or more cameras 762 (e.g., image data and/or video data) may be stored in one or more memories of PED 700 (e.g., memory 706, NAND 710, and/or ROM 750).

In addition, PED 700 may include one or more sensors 764, including one or more of the following sensors: accelerometer, gyroscopic sensor, geomagnetic sensor, gyroscopic sensor, magnetic sensor, proximity sensor, gesture sensor, grip sensor, global positioning system (GPS) sensor, ambient light sensor, pressure sensor, and/or biometric sensor (e.g., such as a pulse rate sensor, a fingerprint sensor, and the like). In some embodiments, PED 700 may acquire information for determining a position, orientation, and or acceleration (e.g., a particular type of motion, such as a circular motion or the like) of the PED and/or of a user holding, wearing, and/or manipulating the PED. In some embodiments, PED 700 may be affixed or proximate to the user's body such that one or more sensor 764 may determine characteristics of the user (e.g., of the user's body), including heart rate, muscle tension (e.g., to determine whether the user is opening or closing, or has opened or has closed, his or her hand), and/or types of movement (e.g., finger tapping, clapping, arm waving, gait, and the like). The at least one processor may control execution of a function(s) or an operation(s) corresponding to an input received through the PED and/or through any other user input device (for example, user input device 130) in response to a received input.

In addition, PED 700 may include one or more microphones 766. The one or more microphones 766 may be coupled to processor(s) 702, which may execute program instruction for receiving and processing input received via microphone(s) 766. Data received via the one or more microphones 766 (e.g., audio data) may be stored in one or more memories of PED 700 (e.g., memory 706, NAND 710, and/or ROM 750). PED 700 may include one or more speakers 768. The one or more speakers 768 may be coupled to processor(s) 702, which may execute program instruction for outputting data (e.g., audio data) via speaker(s) 768. The audio data output via speaker(s) 768 may be retrieved from one or more of the memories of PED 700 (e.g., memory 706, NAND 710, and/or ROM 750), received via wired or wireless communication (e.g., via one or more of short range wireless communication circuitry 729, cellular communication circuitry 730, or connector interface (I/F) 720), and/or received via microphone(s) 766.

In addition, PED 700 may include one or more components not explicitly depicted in FIG. 7. For example, PED 700 may include a light source (e.g., a flash, including a flash associated with camera(s) 762). In addition, PED 700 may include a vibration generator (e.g., a haptic engine or any other component capable of generating mechanical stimulation). In addition, PED 700 may include one or more user controls (e.g., a control button, which may include a "home" button, a power button, volume controls, a keyboard (physical or virtual), and the like). These components may be coupled to processor(s) 702, which may execute program instructions for outputting data (e.g., light data, vibration data) via these components.

As described herein, the PED 700 may include hardware and software components for implementing the features described herein, e.g., PED 700 may form at least part of a display system (e.g., a 3D display system) such as system 100 described above. For example, the processor 702 of the PED 700 may be configured to implement part or all of the features described herein, e.g., by executing program instructions stored on a memory medium (e.g., a non-transitory computer-readable memory medium). Alternatively (or in addition), processor 702 may be configured as a programmable hardware element, such as an FPGA (Field Programmable Gate Array), or as an ASIC (Application Specific Integrated Circuit). Alternatively (or in addition) the processor 302 of the wireless station 106, in conjunction with one or more of the other components of PED 700 (e.g., 704, 706, 710, 720, 735, 750, 760, 762, 764, 766, and/or 768) may be configured to implement part or all of the features described herein.

As described herein, processor 702 may include one or more processing elements. Thus, processor 702 may include one or more integrated circuits (ICs) that are configured to perform the functions of processor 702. In addition, each integrated circuit may include circuitry (e.g., first circuitry, second circuitry, etc.) configured to perform the functions of processor(s) 702.

According to some embodiments, PED 700 may be configured as an input device and/or as a device to receive, store, transmit, process, and/or otherwise use data associated with the display system. For example, PED 700 may be configured as a display of any of the described systems. In some embodiments, PED 700 may be configured to communicate with any of the systems described here (e.g., such as a display system, including a 3D display system and/or a 2D display system) either wirelessly (e.g., via a local area network such as a WiFi, Bluetooth, Bluetooth low energy connection, radio frequency identification, near field communication, or the like) or via a wired interface such as a universal serial bus interface, among other wired interfaces. PED 700 may be "paired" or "synchronized" to the display system via any of the above methods of communication.

The display system may establish communications with the PED. During an initial set-up of a PED with the system (e.g., the display system), a user may interact with the PED to send information to the display system. For example, a user may sign in to a profile associated with that user. The display system may use information in a user's profile to customize interaction with the display system. According to some embodiments, a user's profile may include one or more of the following attributes of the user: name, gender, height, handedness, age, preference information (e.g., general preferences and/or application-specific preferences), interpupillary distance, and/or the like. Note that a single PED may be associated with a single user or, alternatively, with a plurality of users. Furthermore, one or more PEDs may be paired to a single display system. Information associated with the user or with the plurality of users (e.g., profile information) may be transmitted to the display system automatically (e.g., in response to the PED pairing with the display system) and/or in response to user input. A user may further interact with a PED to create a profile associated with that user or with another user (e.g., when a profile for that user or the other user has not yet been created).

According to some embodiments, the PED may be prepared to interact with the display system (or to more fully interact with the display system). That is, not all PEDs need to be modified to interact with the display system. For example, the PED may be modified (e.g., augmented) with additional hardware and/or additional software. Some personal devices may be modified with a polarizer added to the one or more cameras 762 (e.g., a front camera and/or a back camera). Some PEDs may be modified with additional software (e.g., an application, such as an application downloaded to the PED and stored in one or more memories of the PED, such as memory 706, NAND 710, and/or ROM 750). The software and/or hardware may allow the PED to perform (or to improve performance of) some or all of the embodiments disclosed herein.

Once a PED has been paired with the display system, the PED may communicate with the display system as a user input device (e.g., via one or more of short range wireless communication circuitry 729, cellular communication circuitry 730, and/or connector interface (I/F) 720). The various capabilities/features of the PED may be used to allow a user to input information to the display system. The information input to the display system may include control information (e.g., user input to control one or more features of the display system, such as designation and/or manipulation of an object displayed on the display system) and/or input data (e.g., an image file for display on the display system, including a raw image file and/or a processed image file). The PED may provide some capabilities that other user input devices (e.g., user input device 130, which may include a stylus) may lack, as described below.

Figure 8:
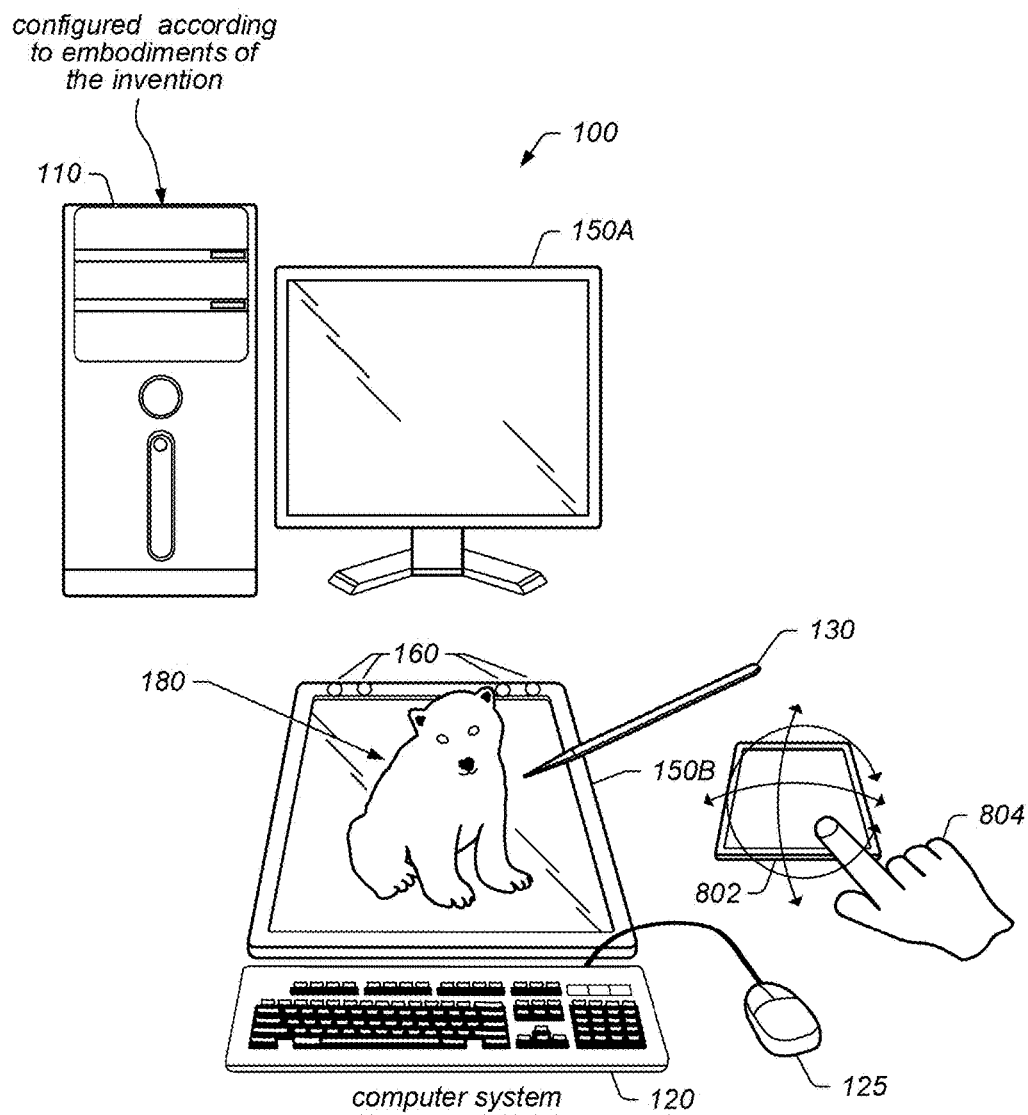
FIG. 8 illustrates an example of using a PED to interact with a display system, according to some embodiments.

Various uses of a PED as an input device to a display system are described herein. According to some embodiments, user may hold the PED in one hand (e.g., in a less dominant hand) and/or the PED may be otherwise situated such that the user may interact with the PED (e.g., the PED may be docked, such as via connector interface (I/F) 720, or located on a surface proximate to the user and/or to the display system, as depicted in FIG. 8, described further below).

Figure 9A:
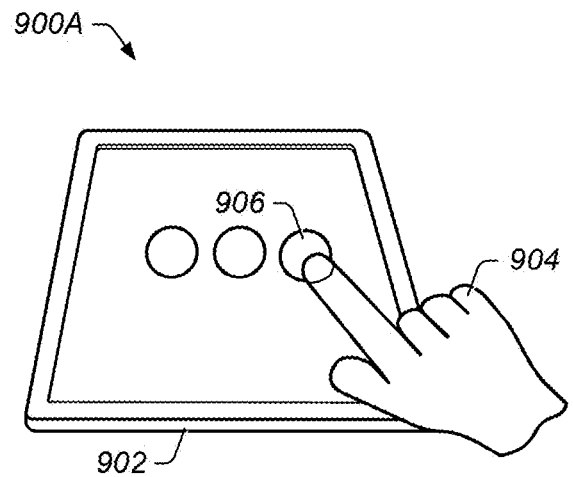
FIGS. 9A and 9B illustrate an example of a user interacting with a PED, according to some embodiments.
Figure 9B:
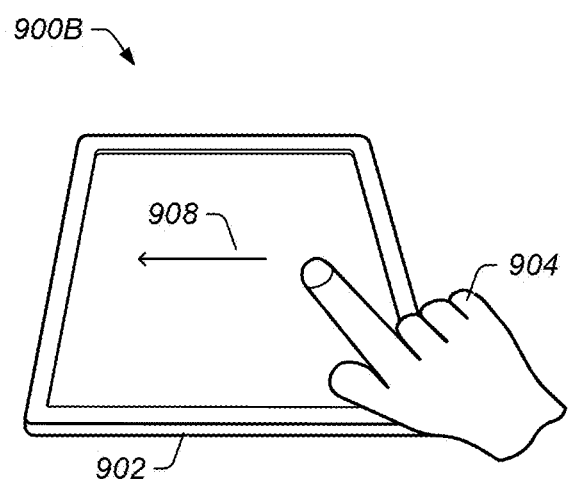

Turning to FIGS. 9A-B, FIGS. 9A-B illustrate an example of a user interacting with a PED, according to some embodiments. A user may interact with the display system via the display of the PED (e.g., display 760, which may include a touch screen). For example, as depicted in FIG. 9A, one or more selectable elements may be displayed on the display of the PED (e.g., a touch keyboard, which may include selectable elements 906) such that, upon selection of one of the elements, a corresponding action (e.g., a control input and/or user input data) is communicated to the display system via the PED. For example, the one or more selectable elements 906 may include an array of buttons, wherein a button in the array of buttons corresponds to user input (e.g., to a control and/or to user input data). The one or more buttons may include keys of a virtual keyboard, a "selection" button, a "delete" button, and the like. In some embodiments, the one or more selectable elements 906 may include a color pallet. A user may select one or more colors from the color pallet and interact with the display system using the one or more selected colors. For example, a user may draw from the colors in the color pallet and may "paint" (e.g., using a separate user input device, such as a stylus). In some embodiments, the one or more selectable elements 906 may include one or more objects (e.g., a pallet of objects) such that, upon selection of the one or more objects, a representation of the selected object is displayed on the display system. In other words, data corresponding to the selected object may be transmitted to the display system via the PED (e.g., via one or more of short range wireless communication circuitry 729, cellular communication circuitry 730, or connector interface (I/F) 720). The one or more objects may be downloaded to the PED (e.g., via one or more of short range wireless communication circuitry 729, cellular communication circuitry 730, or connector interface (I/F) 720) and stored in one or more of the memories of PED 700, such as memory 706, NAND 710, and/or ROM 750) or the one or more objects may be captured by the PED (e.g., via camera(s) 762, including a front camera and/or a rear camera). According to some embodiments, when the selected object is transmitted to the display system, the transmission may be accompanied by an animation (e.g., on display 760, display 150A, and/or display 150B) indicating the transmission (e.g., the selected object may be "squirted" onto a display of the display system).

In some embodiments, as illustrated in FIG. 9B, a track pad may be displayed on the display (e.g., display 760) of PED 902 such that a user may initiate a control input to the display system (e.g., system 100) in the form of a gesture (e.g., swipe 908) using the user's hand 904. Alternatively, the entire screen may constitute the "track pad" such that a virtual representation of the track pad is not displayed on PED 902. A 2D finger operation on the PED touch screen, such as pinching, tapping, swiping, and/or holding and dragging, may be mapped to functions in the display system (e.g., in 3D virtual space). In other words, a user may manipulate one or more objects and/or the environment displayed on the display system via gestures input via the PED (e.g., via display 760, which may include a touch screen and/or via one or more other control inputs of PED 760, such as a control button). Additionally, a user may use the touch screen as a track pad such that an indicator or an object (e.g., a virtual 3D object) presented on the display system tracks the user's finger via the track pad. In other words, the user may manipulate the indicator and/or the object via the track pad displayed on the touch screen of the PED. According to some embodiments, a user may transmit a control input by means of the track pad. For example, a user may use a user input device (e.g., user input device 130, which may include a stylus) to designate (e.g., select) an image and/or an object displayed on the display system and use the track pad to perform a selected action on the designated image/object. In other words, a user may manipulate the position and/or orientation of a selected image, object, or virtual environment (e.g., a user may drag and/or rotate the image or object) and use the track pad (e.g., tap the track pad) to drop the image or object once the image or object is in a position on the display of the display system (e.g., at a particular location in 3D virtual space) of the user's choosing. According to some embodiments, information associated with a selected object or image may be displayed in response to control input via the track pad. According to some embodiments, user input data may be received via the track pad. For example, the touch screen may be used to receive user input data directly (i.e., not via selection of one or more buttons or preconfigured options). In other words, the track pad may receive various types of user input data, including a signature, handwriting, handwritten notes, drawings, and the like. The PED and/or the display system may perform processing on the received user input data received via the track pad (e.g., handwriting recognition).

According to some embodiments, a user may interact with the display system via camera(s) 762 (e.g., a front camera and/or a rear camera) of the PED. For example, the PED may be used to provide information (e.g., input data in the form of an image or video) to the display system. In some embodiments, a camera of the PED may be used to capture information (e.g., imagery and/or video) from the user's environment. A camera of the PED may also capture information from the screen of the display system. For example, the camera may capture identification information (e.g., a 2D Quick Response (QR) code) in order to lock on to and/or identify the display system. The camera of the PED may capture marker information (e.g., the display system may display one or more markers of the screen of the display system) to allow the PED to determine its own position and/or orientation relative to the display system (e.g., to the screen of the display system). The captured information may be stored in one or more memory of the PED (e.g., in memory 706, NAND 710, and/or ROM 750) and/or the captured information may be directly transmitted to the display system (e.g., via one or more of short range wireless communication circuitry 729, cellular communication circuitry 730, or connector interface (I/F) 720). In some embodiments, a user may initiate the capture of information by using the camera flash. Alternatively, a user could use the touch screen of the PED (or other means of input to the PED, such as a button input) to initiate the capture of information. In some embodiments, the display system may be provided information from the user's environment using the PED. For example, the user may use the PED camera (e.g., the front or rear camera) to capture information from the user's environment. In some embodiments, the display system may integrate the information from the user's environment into the imagery presented on the display of the display system. For example, the information from the user's environment may be used by the display system to determine lighting, reflections, and the like (e.g., to enhance immersion).

The camera of the PED (e.g., camera(s) 762, which may include a front and/or rear camera) may be used to communication control input and/or input data (e.g., image, video, and/or textual information) to the display system. For example, the camera of the PED may capture image and/or video information of a user's hand(s) and/or finger(s) and use this information to communicate control information (e.g., commands) and/or input data (e.g., textual information) to the display system. According to some embodiments, the camera of the PED may capture image and or video information so as to detect the user's finger positions and, thus, detect typing. In other words, the camera may be used to recognize the user's fingers and determine the position and motion of the user's fingers. Using this captured information, the PED and/or the display system may allow the user to type using virtual keyboard in the air. The captured image and/or video information that is transmitted to the display system may be the raw image and/or video information or processed image and/or video information. In other words, the PED, the display system, or both may determine the one or more keys of the virtual keyboard being "pressed" by the user. The microphone of the PED may be used to communicate control input (e.g., verbal commands) and/or input data (e.g., audio data) to the display system.

A user may interact with the display system via sensor(s) 764 (e.g., sensors that detect orientation, position, and/or acceleration) of the PED. For example, the PED may be used to provide information (e.g., control input) to the display system using the one or more sensors of the PED. In some embodiments, a user may use the PED to control the position and/or orientation of an object (e.g., a selected object in a 3D virtual space) by manipulating the position and/or orientation of the PED. The display system may use a user input device (e.g., a stylus) or head tracking of the user to control the orientation of the display space (e.g., of the 3D virtual space) and the user may control the position and/or orientation of a selected object by the one or more sensors of the PED. In some embodiments, the PED may be docked (e.g., via connector interface (I/F) 720) or otherwise situated proximate to the user and/or to the display system (as illustrated in FIG. 8) so as to provide control input via the one or more sensors of the PED. For example, if the touch screen of PED 802 is facing substantially up (e.g., away from a surface on which the PED or a dock for the PED is placed), a user may manipulate the PED (e.g., by changing the yaw, pitch, and/or roll of PED 802) using the user's hand 804 such that, responsive to the manipulation, a corresponding indicator and/or object (e.g., object 180) on system 100 may be thereby controlled. In other words, as a user "tips" PED 802 (e.g., to the top, bottom, left, right), a cursor position or object moves correspondingly on system 100 (e.g., in 3D virtual space). In some embodiments, the dock may be integrated on one or more displays of the display system and/or may be distinct from a display of the display system (e.g., the dock may be resting on a surface proximate to the display system). If the PED is resting on (or otherwise coupled to) the dock, the PED may be held in place while not in use. Note that, a PED resting on the dock may have one or more degrees of rotational freedom (e.g., yaw, pitch, and/or roll) while docked (thereby facilitating user interaction driven by the sensors of the PED without requiring the user to hold the PED, which may be tiresome, difficult, and/or impossible for some users). In some embodiments, the speed and/or the extent of the displacement of the indicator and/or object may be related (e.g., may correspond) to the extent of the deflection of the PED and/or to the length of time the PED is deflected from a default position (e.g., from a substantially horizontal position/orientation). In some embodiments, the PED may act as a stand-in device for another user input device (e.g., a stylus). That is, the PED may inherit one or more software interactions afforded to the other user input device (e.g., picking, grabbing, navigating, receiving feedback, such as haptic feedback, sending control information, such as a button press, and the like). Note that the PED may inherit these software interactions without application-level software changes (e.g., such changes may be necessary with existing stylus-based applications in the prior art).

Various uses of a PED as a device to receive, store, transmit, process, and/or otherwise use data associated with the display system are described herein. According to some embodiments, a user may receive information from the display system via the PED. For example, audio information corresponding to information presented on the display of the display system may be received by the PED. The audio information may be played to the user (e.g., via one or more speakers of the PED) and/or saved to a storage of the PED for later use. The audio may be played by the PED in response to receiving the audio from the display device (e.g., played immediately or substantially immediately after reception), the audio may be played after some predetermined or context-specific delay (e.g., after a pre-set duration or in response to receiving further information from the display system), or the audio may be played in response to receiving user input at the PED (e.g., in response to user input via the touch screen or one or more buttons of the PED). In some embodiments, the PED may provide a haptic effect (e.g., a vibration) in response to receiving information from the display device (e.g., via one or more vibrational elements of the PED). For example, the haptic effect may be responsive to a predetermined trigger (e.g., a trigger related to one or more objects displayed in the display system) or to user input.

According to some embodiments, the PED may receive information (e.g., image data, video data) corresponding to information presented on the display of the display system. In other words, the PED may receive information for presentation to the user, wherein the information corresponds to a view of the imagery presented on the display of the display system from a different perspective. For example, the PED may receive information corresponding to a view of the imagery presented on the display of the display system from the perspective of the PED. The PED may provide position and/or orientation information to the display system and the PED may receive this image from the perspective of the PED in response. Note that, once information has been received by the PED from the display system, the PED may transmit that information (e.g., a representation of a 3D object) to any other device capable of receiving information (e.g., another user's PED, another computer device, another mobile device, a printer, including a 3D printer, and the like).

Various examples of embodiments of the above features of using a PED with a display system are disclosed herein. For example, a user may interact with a display system (e.g., a 2D or a 3D display system, such as system 100). According to some embodiments, the user may be using the display system in an educational capacity (e.g., in the course of the user's studies or as an instructor), in an entertainment capacity, in a business capacity, and the like. The user may interact with the display system by, for example, transmitting, via a PED, an image and/or an object to the display system for display. Prior to transmission of the image and/or the object, the user may use the PED to capture the image (or a representation of the image). For example, the user may take a picture or video (e.g., via camera(s) 762) of an image. Alternatively (or in addition), the image may be transferred (e.g., via one or more of short range wireless communication circuitry 729, cellular communication circuitry 730, or connector interface (I/F) 720) to the PED (e.g., downloaded to the PED), including from the display system. Once the PED has received the image (by any of the above components), the image may be stored in one or more memories of the PED (e.g., in memory 706, NAND 710, and/or ROM 750). Once the display system has established communications with the PED (e.g., after the PED and the display system have "paired"), the PED may transmit the image (or a representation of the image) to the display system, as described above. In response to receiving the image from the PED (or the representation of the image), the display system may display the image (e.g., via display 150A or display 150B). According to some embodiments, the display system may reproduce the image as the image was received from the PED (e.g., without modification and/or processing). Alternatively, the display system may process the image received from the PED before displaying the image (e.g., the display system may generate a 3D representation of the image from the 2D image received from the PED). Alternatively, the display system may recognize the image received from the PED (e.g., the display system may use image recognition software) and display to the user an image corresponding to the received image (e.g., the display system may retrieve an image stored in a database that corresponds to the recognized image received from the PED).

Once the display system has received the image from the PED and has displayed the image via a display, the user may control one or more aspects of the display (e.g., the virtual environment and/or the object/image) via the PED. In other words, as described above, the user may transmit one or more control inputs and/or input data to the display system via the PED (e.g., via one or more of display 760, which may include a touch screen, camera(s) 762, sensor(s) 764, and/or microphone(s) 766).

Figure 10:
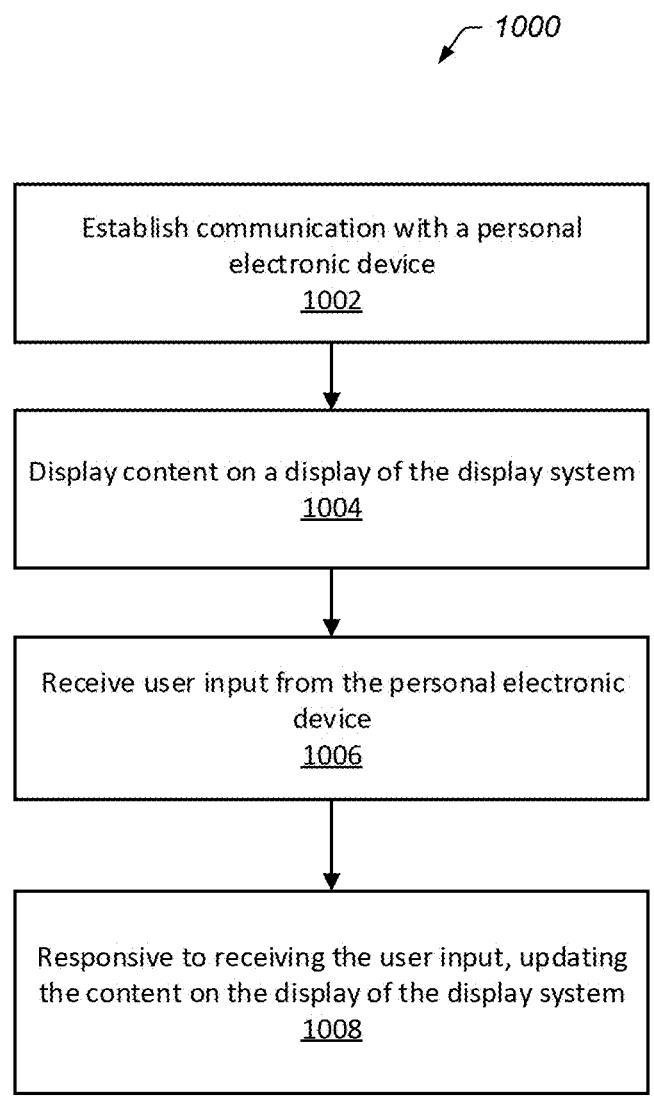
FIG. 10 illustrates a flowchart of a method for interacting with a display system using a PED, according to some embodiments.

FIG. 10 illustrates a flow chart for a method for interacting with a display system using a PED. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, the display system may establish communication with a PED. As discussed above, the PED may communicate with the display system via a local area network such as a WiFi, Bluetooth, Bluetooth low energy connection, near field communication (NFC), and/or radio frequency identification (RFID)) or via a wired interface. During an initial set-up of a PED with the display system, a user may interact with the PED to send information to the display system. For example, a user may sign in to a profile associated with that user. The display system may use information in a user's profile to customize interaction with the display system.

At 1004, the display system may display content on a display of the display system. The display system may be configured to display a 3D scene (e.g., via stereoscopic images), or 3D content using one or more displays (e.g., displays 150A and/or display 150B of FIG. 3). The displayed content may include objects (e.g., 3D virtual objects) and/or user interface (UI) elements (e.g., selectable elements that allow a user to interact with the content and/or with the display system).

At 1006, the display system may receive user input from the PED. The PED may be configured as an input device to the display system and/or as a device to receive, store, transmit, process, and/or otherwise use data associated with the display system (e.g., data associated with the content displayed by the display system). The PED may provide user input to the display system that includes one or more control inputs that allow the user to update the displayed content (e.g., by manipulating one or more virtual objects according to the control inputs). The PED may provide user input to the display system that includes input data (e.g., video data, image data, and/or audio data) corresponding to information received, stored, transmitted, processed, and/or otherwise used by the PED.

At 1008, the display system may update the content on the display of the display system responsive to the display system receiving the user input. For example, if the display system receives a control input from the PED, the display system may update the displayed content by manipulating the content according to the received control input. If the display system receives user input data, the display system may update the displayed content by presenting the user input data on the display of the display system (e.g., incorporating the user input data into the displayed content).

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by a processor of a three dimensional (3D) stereoscopic display system to:
   establish communication with a personal electronic device (PED);
   display one or more 3D virtual objects on a display of the 3D stereoscopic display system, wherein the one or more 3D virtual objects include a first 3D virtual object comprising marker information comprising a two dimensional Quick Response (QR) code, wherein the PED is configured to capture, via a camera of the PED, the marker information and determine, based on the marker information, position and/or orientation of the PED relative to the display of the 3D stereoscopic display system;
   receive user input and user environmental information from the PED, wherein the user input includes one or more control inputs, wherein the one or more control inputs include changing a physical position and orientation of the PED in physical space and relative to the display of the display system such that a corresponding position and orientation of at least one of the one or more 3D virtual objects is changed in virtual space;
   determine, based on the received user environmental information, lighting and reflections of an environment of the user;
   update the one or more 3D virtual objects on the display of the 3D stereoscopic display system based on the received user input and user environmental information; and
   transmit, to the PED, information corresponding to the at least one 3D virtual object, wherein the transmitted information further includes a two dimensional (2D) representation of the at least one 3D virtual object, wherein the 2D representation includes an x-ray slice of the at least one 3D virtual object, and wherein the PED is configured to display the 2D representation.

2. The non-transitory computer readable memory medium of claim 1, wherein the programming instructions are further executable to:
   responsive to establishing communications with the PED, receiving, from the PED, profile information corresponding to a user; and
   store the profile information in a memory of the display system.

3. The non-transitory computer readable memory medium of claim 1, wherein the updating the one or more 3D virtual objects includes manipulating one or more 3D virtual objects according to the one or more control inputs.

4. The non-transitory computer readable memory medium of claim 1, wherein the one or more control inputs corresponds to input received via one or more features of the PED.

5. The non-transitory computer readable memory medium of claim 4, wherein the one or more features of the PED include one or more of the following features:
- touch screen;
- one or more cameras;
- one or more sensors;
- one or more microphones; or
- one or more vibration generators.

6. The non-transitory computer readable memory medium of claim 5, wherein the one or more sensors provide one or more of the following inputs:
- position of the PED;
- orientation of the PED;
- acceleration of the PED;
- velocity of the PED;
- angular acceleration of the PED;
- angular velocity of the PED.

7. The non-transitory computer readable memory medium of claim 5, wherein the one or more control inputs received via the touch screen includes a gesture, and wherein the updating the one or more virtual objects includes updating at least one of a position or an orientation of the one or more virtual objects.

8. The non-transitory computer readable memory medium of claim 5, wherein the one or more control inputs received via the one or more cameras includes information corresponding to one or more selections of a virtual keyboard.

9. The non-transitory computer readable memory medium of claim 5, wherein the one or more control inputs received via the one or more microphones includes one or more verbal commands.

10. The non-transitory computer readable memory medium of claim 1, wherein the PED includes one of the following devices:
- a smartphone;
- a tablet;
- a laptop;
- a smart watch;
- a wearable electronic device.

11. The non-transitory computer readable memory medium of claim 1, wherein the display system and the PED communicate via a wireless and/or a wired interface.

12. The non-transitory computer readable memory medium of claim 1, wherein the programming instructions are further executable to:
- cause one or more selectable elements to be displayed on a display of the PED;
- wherein the user input received from the PED includes at least one of the one or more selectable elements.

13. The non-transitory computer readable memory medium of claim 12, wherein the updating the one or more 3D virtual objects on the 3D display of the 3D stereoscopic display system includes generating a graphical representation of the at least one of the one or more selectable elements.

14. The non-transitory computer readable memory medium of claim 12, wherein the one or more selectable elements include one or more of the following elements:
- color palette;
- virtual keyboard;
- control panel;
- geometric shapes.

15. The non-transitory computer readable memory medium of claim 1, wherein the user input includes input data corresponding to information captured by the PED.

16. The non-transitory computer readable memory medium of claim 15, wherein the input data includes one or more of image data, video data, and/or audio data.

17. The non-transitory computer readable memory medium of claim 15, wherein the updating the one or more 3D virtual objects includes generating a 3D virtual object corresponding to the information captured by the PED.

18. The non-transitory computer readable memory medium of claim 17, wherein the 3D virtual object includes a virtual representation of an object in an image captured by the PED.

19. The non-transitory computer readable memory medium of claim 1, wherein the information corresponding to the one or more virtual objects on the display of the display system is in a format configured for storage in a memory of the PED.

20. The non-transitory computer readable memory medium of claim 1, wherein the information corresponding to the one or more virtual objects on the display of the display system is in a format configured for display on a display of the PED.

21. The non-transitory computer readable memory medium of claim 1, wherein the 2D representation further includes text corresponding to one or more elements of the at least one 3D virtual object.

22. The non-transitory computer readable memory medium of claim 1, wherein the information corresponding to the at least one 3D virtual objects further includes content configured for presentation to a user of the PED via two or more of a display of the PED, one or more speakers of the PED, or one or more vibrational elements of the PED.

23. The non-transitory computer readable memory medium of claim 1, wherein the one or more control inputs includes a control to pan or tilt one of the one or more virtual objects.

24. The non-transitory computer readable memory medium of claim 1, wherein the one or more control inputs include one or more software interactions.

25. The non-transitory computer readable memory medium of claim 24, wherein the one or more software interactions include one or more of:
- picking;
- grabbing;
- navigating;
- receiving haptic feedback; or
- a button press.

26. A method, comprising:
- establishing, by a three dimensional (3D) display system, communication with a personal electronic device (PED);
- displaying, by the 3D display system, one or more 3D virtual objects on a 3D display of the display system, wherein the one or more 3D virtual objects include a first 3D virtual object comprising marker information, wherein the PED is configured to capture, via a camera of the PED, the marker information and determine, based on the marker information, position and/or orientation of the PED relative to the display of the 3D display system;
- receiving, by the 3D display system, user input and user environmental information from the PED, wherein the user input includes one or more control inputs, wherein the one or more control inputs include changing a physical position and orientation of the PED in physical space and relative to the display of the display system such that a corresponding position and orientation of at least one 3D virtual object of the one or more 3D virtual objects is changed in virtual space;

determining, by the 3D display system and based on the received user environmental information, lighting and reflections of an environment of the user;

updating, by the 3D display system, the one or more 3D virtual objects on the 3D display of the 3D display system based on the received user input and user environmental information; and transmitting, to the PED, information corresponding to the one or more 3D virtual objects, wherein the transmitted information includes content configured for presentation to a user of the PED via two or more of a display of the PED, one or more speakers of the PED, or one or more vibrational elements of the PED, wherein the transmitted information further includes a two dimensional (2D) representation of the at least one 3D virtual object, wherein the 2D representation includes an x-ray slice of the at least one 3D virtual object, and wherein the PED is configured to display the 2D representation.

27. The method of claim 26,
wherein the information corresponding to the at least one 3D virtual object further includes text corresponding to one or more elements of the at least one 3D virtual object.

28. A three dimensional (3D) display system, comprising;
a 3D display;
a processor coupled to the 3D display; and
a memory coupled to the processor, wherein the memory has stored thereon instructions executable by the 3D display system to cause operations comprising:
establish communication with a personal electronic device (PED);
display one or more 3D virtual objects on the 3D display, wherein the one or more 3D virtual objects include a first 3D virtual object comprising two dimensional (2D) marker information, wherein the PED is configured to capture, via a camera of the PED, the 2D marker information and determine, based on the 2D marker information, position and/or orientation of the PED relative to the 3D display;

receive user input and user environmental information from the PED, wherein the user input includes one or more control inputs, wherein the one or more control inputs include changing a physical position and orientation of the PED in physical space and relative to the display such that a corresponding position and orientation of at least one 3D virtual object of the one or more 3D virtual objects is changed in virtual space;

update the one or more 3D virtual objects on the 3D display of the 3D display system based on the received user input and user environmental information; and transmit, to the PED, information corresponding to the at least one 3D virtual object, wherein the transmitted information includes a two dimensional (2D) representation of the at least one 3D virtual object, wherein the 2D representation includes an x-ray slice of the at least one 3D virtual object, and wherein the PED is configured to display the 2D representation.

29. The 3D display system of claim 28,
wherein the information corresponding to the at least one 3D virtual object further includes content configured for presentation to a user of the PED via two or more of a display of the PED, one or more speakers of the PED, or one or more vibrational elements of the PED.

30. The 3D display system of claim 28,
wherein the information corresponding to the at least one 3D virtual object further includes text corresponding to one or more elements of the at least one 3D virtual object.

* * * * *